UNITED STATES PATENT OFFICE.

CHRISTIAN HEINZERLING, OF FRANKFORT-ON-THE-MAIN, GERMANY.

TREATMENT OF OLD OR WASTE VULCANIZED RUBBER.

SPECIFICATION forming part of Letters Patent No. 627,689, dated June 27, 1899.

Application filed March 22, 1898. Serial No. 674,841. (No specimens.)

*To all whom it may concern:*

Be it known that I, CHRISTIAN HEINZERLING, a subject of the Emperor of Germany, residing at Frankfort-on-the-Main, Germany, have invented an Improvement in Treatment of Old or Waste Vulcanized Rubber, of which the following is a description.

This invention has for its object the production of a method or process for converting chips or scraps of vulcanized rubber or articles thereof which have deteriorated or become unserviceable into a condition fit to be employed or used again.

In accordance with this invention the rubber to be regenerated or restored is preferably divided as finely as practicable and it is dissolved by the application of heat in conjunction with anilin, toluidin, xylidin, or their higher homologues either by themselves or mixed together one or more. The solvent effect of these substances upon vulcanized soft rubber has been disputed hitherto, (see the *Neues-Handworterbuch der Chemie, bearbeitet und redigirt von Dr. Herman Fehling, Brauschweig, 1874, Verlag von Friedrich Vieney & Sohn*, Vol. I, page 574,) but in the course of my experiments I have found that their dissolving power is greater than that of the solvents hitherto used for dissolving india-rubber, and for the purpose of the present invention the before-mentioned solvents have the additional advantage over the ordinary solvents that the former are capable of being separated from the rubber solution far more readily than is the case with the ordinary solvents heretofore employed.

The proportion in which the solvents should be added to the rubber in practicing my invention varies according to the nature and quantity of other ingredients or media present in the rubber to be dissolved. Comparatively pure waste rubber requires more of the solvent, while rubber containing a large amount of mineral matter may be treated with a less amount of the solvent. So, too, the proportion of solvent is to a certain extent dependent upon whether or not it is desired to separate the mineral matter after having dissolved the rubber. In the former case the solution should be more fluid in order that the mechanical process of separation may be conveniently performed. When the dissolving process is completed, (and after the mineral ingredients have been mechanically separated from the india-rubber or not, as the case may be,) the solvent and rubber are separated, and for this purpose a suitable acid (preferably hydrochloric or sulfuric acid) is added to the solution. The salts formed by the solvent, in conjunction with the acid, will dissolve in the water which has been added with the acid, while the rubber will separate in the form of a concrete mass.

Instead of the foregoing procedure there may be mixed with the solution a liquid capable of dissolving the solvent employed, but incapable of dissolving the rubber. Among agents which will produce this effect spirit—*i. e.*, methyl alcohol, amyl alcohol, ethyl alcohol, and the like—will be found very suitable.

The rubber obtained by either of the methods hereinbefore described is separated from the liquid which collects at the top in the vessel in which the process is carried out, and this liquid is decanted, and the rubber is then washed and dried. Instead, however, the solvent may be separated by distillation—as, for instance, in a chamber wherein the air has been rarefied for the purpose; but this mode of separation will prove expedient only in exceptional cases.

Having now particularly described and ascertained the nature of my invention and in what manner the same is to be performed, what I claim, and desire to secure by Letters Patent, is—

1. Regenerating or restoring old or waste rubber, by dissolving the same by the action of anilin, toluidin, or xylidin, and thereafter separating the solvent from the india-rubber.

2. Regenerating or restoring old or waste rubber, by dissolving the same by the action of anilin, toluidin, or xylidin, in conjunction with heat, and thereafter separating the solvent from the india-rubber.

3. Regenerating or restoring old or waste rubber, which consists in dissolving the same by anilin, toluidin, or xylidin, in the presence of heat, and thereafter separating the solvent and the rubber by converting the solvent into an aqueous salt solution, from which the rubber separates.

4. Regenerating or restoring old or waste rubber, which consists in dissolving the same by anilin, in the presence of heat, and thereafter converting the solution into an aqueous salt solution by the addition of an acid diluted with water, to thereby separate the rubber therefrom.

5. In the process of regenerating or restoring old or waste rubber, adding to the solution of dissolved rubber and its solvent a dilute acid, to thereby form an aqueous salt solution from which the rubber separates.

6. The process of regenerating or restoring old or waste rubber which consists in dissolving the same by anilin, in the presence of heat, and thereafter effecting the separation of the rubber by the addition to the solution of a liquid capable of dissolving the solvent but inert as to the rubber.

In testimony whereof I have signed my name to this specification in the presence of two subscribing witnesses.

CHRISTIAN HEINZERLING.

Witnesses:
JOSEF HAGEMEIER,
FRANK H. MASON.